Figure 1:
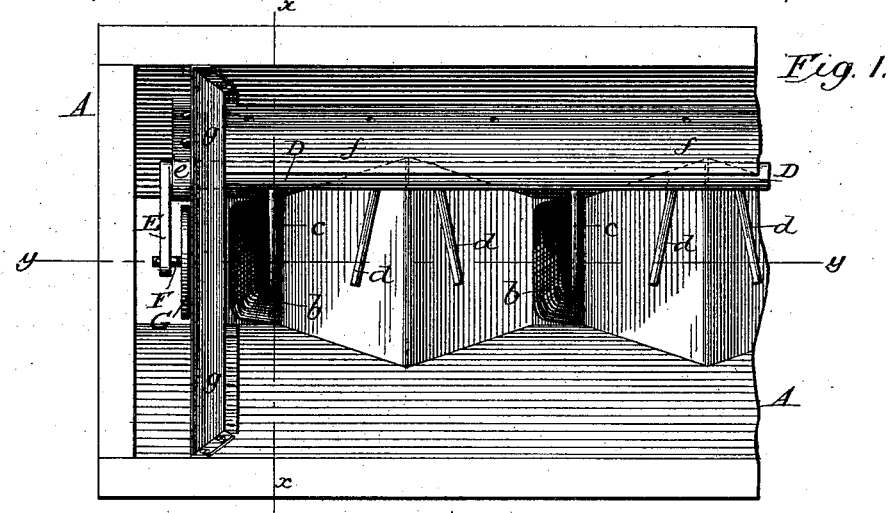

(No Model.)

R. B. SHELDON.
SEEDING MACHINE.

No. 358,303. Patented Feb. 22, 1887.

ON LINE X—X

ON LINE Y—Y

WITNESSES
Sidney P. Hollingsworth
Wm. T. Kennedy

INVENTOR
Richard B. Sheldon
By P. T. Dodge
Attorney

UNITED STATES PATENT OFFICE.

RICHARD B. SHELDON, OF SHORTSVILLE, NEW YORK, ASSIGNOR TO THE EMPIRE DRILL COMPANY, OF SAME PLACE.

SEEDING-MACHINE.

SPECIFICATION forming part of Letters Patent No. 358,303, dated February 22, 1887.

Application filed August 23, 1886. Serial No. 211,653. (No model.)

*To all whom it may concern:*

Be it known that I, RICHARD B. SHELDON, of Shortsville, in the county of Ontario and State of New York, have invented certain Improvements in Seeding-Machines, of which the following is a specification.

The present invention has reference more particularly to that class of seeding-machines in which the grain is delivered continuously from a main hopper or seed-box by means of vertical distributer-wheels revolving in feed cups or casings thereunder, and commonly known in the art as "force-feed devices."

The particular aim of the invention is to adapt the machine for feeding continuously and with certainty certain classes of oats and other grains and seeds which have a tendency to pack or lodge in the hopper, so that they do not flow readily to the distributer-wheels; and to this end it consists in combining with the distributer vibratory agitators located in the lower part of the main hopper and working downward into the feed devices below, whereby they are enabled to perform the two functions of agitating or loosening the mass of seed and of urging or forcing the same downward into the distributing devices.

The essence of my invention consists in the employment of agitators which have a vibratory or to-and-fro motion, and which act to force the grain toward the distributer-wheels, and it is manifest that the details of construction may be variously modified without departing from the limits of my invention.

With the exception of the details hereinafter described, the machine may be of any ordinary construction, and I have therefore deemed it necessary to illustrate in the drawings only those parts to which my improvement applies and the parts immediately connected therewith.

Figure 2:
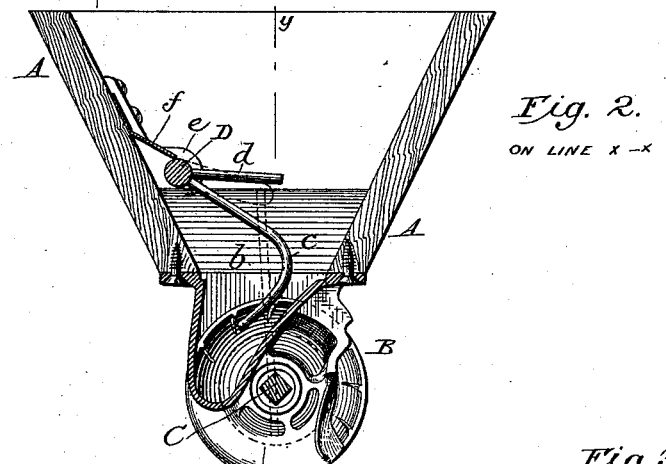
Figure 3:
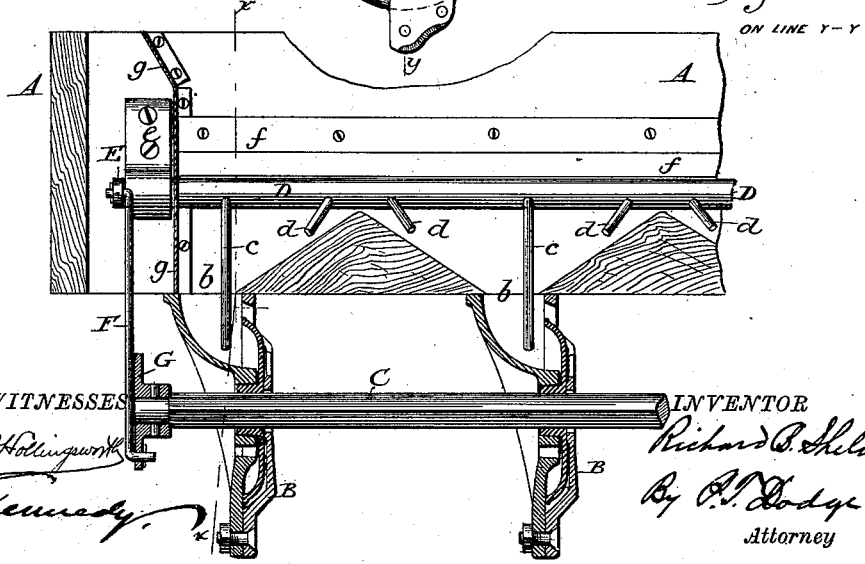

In the accompanying drawings, Figure 1 represents a top plan view of a seed-hopper or grain-box provided with the ordinary distributing mechanism and with my agitating devices. Fig. 2 is a vertical cross-section of the same on the line $xx$. Fig. 3 is a longitudinal vertical section of the same on the line $yy$.

Referring to the drawings, A represents the main hopper or grain-box, provided at the bottom with feed throats or openings $b$, the walls of which are inclined downward in the direction of the delivery, as shown, to facilitate the passage of the seed to the distributing devices.

B B represent the distributers, each consisting in the present instance of a concave disk or wheel revolving within an external casing having at the top a flaring mouth, through which the grain enters from the main hopper.

C represents a horizontal shaft common to the series of wheels and driven in any appropriate manner. These parts are of ordinary construction, and serve, as usual, to deliver the grain entering them from above at the rear, each in a continuous stream.

In applying my improvement in its preferred form I mount in one side of the hopper a rock-shaft, D, extending horizontally from one end of the same to the other, supporting its ends in suitable bearings. At appropriate points in its length this rock-shaft D is provided with fingers $c$, extending outward and downward therefrom, their form being such that their ends may be carried by the rocking motion of the shaft downward into the mouths of the distributers or feed-cups. At one end the rock-shaft is provided with a crank-arm, E, connected by a pitman, F, to a crank-wheel, G, fixed to the shaft C, whereby the rotation of said shaft is caused to operate the rock-shaft and vibrate its fingers $c$ in a vertical direction. These fingers, playing upward and downward, serve to loosen and maintain in a free condition the mass of grain in the main hopper and to assist in delivering the same downward into the distributing devices. To a certain extent they act to forcibly carry the grain downward to the moving surfaces, by which it is delivered from the machine.

As an additional means of loosening the mass of grain and of preventing the same from lodging or becoming compacted, I provide the rock-shaft with a series of arms, $d$, extending horizontally or in any other suitable direction therefrom into the main hopper.

In order that the agitator may be quickly removed, if desired, I propose to seat its ends in bearing-plates e, each secured in place by a bolt or screw, so that it may be readily detached. In place, however, of removing the rock-shaft, the pitman may be disconnected and the shaft turned until its fingers are carried upward against the side of the hopper above their operative position. They may be maintained in this position by a pin inserted under the arm of the agitator-shaft or in any other suitable manner.

To prevent the lodgment of grain behind the agitator-shaft and its escape around the pitman-opening, I propose to provide the hopper on the inside with a sheet-metal guard, $f$, secured to its side and covering the rock-shaft, and with a second guard, $g$, secured in its end and covering the pitman and crank-arm. If preferred, the end of the agitator-shaft may be projected through the hopper and the crank applied to the outside.

It is manifest that the form of the fingers on the agitator-shaft may be varied at will, provided they are adapted to operate in substantially the manner herein described, and that the shaft may receive motion through any suitable mechanism. The best results will be secured when the agitator-shaft is located at the front side of the main hopper, as shown, so that the fingers act to push the grain downward into the forward sides of the distributers and directly against the descending surface of the distributer-wheels.

I do not claim as a part of the present invention a continuously-rotating shaft located in the bottom of the main hopper and provided with fingers sweeping downward through the mouths of the distributers, the present invention being restricted to a mechanism in which the agitator-fingers have a to-and-fro movement, as distinguished from a rotary motion.

While I have represented in the drawings but a single agitator-finger entering each distributer, it is to be understood that two or more fingers may be used for each distributer, if desired.

Having thus described my invention, what I claim is—

1. In a seeding-machine, the combination of the main hopper, the seed-distributer thereunder, the rock-shaft provided with fingers projected downward from the main hopper into the mouth of the distributer, and means, substantially as described, for operating said shaft to give the fingers a rising and falling motion, whereby they are caused to force the grain downward to the distributer.

2. In combination with the main hopper A and the distributer thereunder, a horizontal rock-shaft seated in the main hopper to one side of the vertical plane of the distributer, and fingers projecting from said shaft laterally and downwardly toward the distributer, whereby said fingers are caused to serve the double purpose of agitating and loosening the mass of seed and of forcing the same downward to the distributer.

3. In combination with the main hopper A and a distributer, B, located thereunder, a rock-shaft, D, provided with rising and falling fingers C, to enter the mouths of the distributers, and also with intermediate fingers, $d$, to assist in causing the flow of grain to the feed-fingers.

4. In combination with the main hopper and distributers, the rock-shaft provided with the agitator-fingers $c$, and adapted, as described, to be rotated to throw said fingers upward out of action.

In testimony whereof I hereunto set my hand, this 30th day of July, 1886, in the presence of two attesting witnesses.

RICHARD B. SHELDON.

Witnesses:
FRED A. TITUS,
OLIVER S. TITUS.